US009289728B2

(12) United States Patent
Ishihara et al.

(10) Patent No.: US 9,289,728 B2
(45) Date of Patent: Mar. 22, 2016

(54) MICROPOROUS MEMBRANES, METHODS FOR MAKING SUCH MEMBRANES, AND THE USE OF SUCH MEMBRANES AS BATTERY SEPARATOR FILM

(75) Inventors: Takeshi Ishihara, Kawagoe (JP); Satoshi Miyaoka, Nasushiobara (JP); Koichi Kono, Asaka (JP); Donna J. Crowther, Seabrook, TX (US); Patrick Brant, Seabrook, TX (US)

(73) Assignee: Toray Battery Separator Film Co., Ltd. (JP)

( * ) Notice: Subject to any disclaimer, the term of this patent is extended or adjusted under 35 U.S.C. 154(b) by 304 days.

(21) Appl. No.: 13/260,643

(22) PCT Filed: Mar. 5, 2010

(86) PCT No.: PCT/US2010/026422
§ 371 (c)(1),
(2), (4) Date: Sep. 27, 2011

(87) PCT Pub. No.: WO2010/114672
PCT Pub. Date: Oct. 7, 2010

(65) Prior Publication Data
US 2012/0028131 A1    Feb. 2, 2012

Related U.S. Application Data

(60) Provisional application No. 61/164,817, filed on Mar. 30, 2009, provisional application No. 61/164,833, filed on Mar. 30, 2009, provisional application No. 61/164,827, filed on Mar. 30, 2009, provisional (Continued)

(30) Foreign Application Priority Data

| May 25, 2009 | (EP) | 09160964 |
| May 25, 2009 | (EP) | 09160965 |
| May 25, 2009 | (EP) | 09160966 |
| May 25, 2009 | (EP) | 09160967 |
| Jun. 25, 2009 | (EP) | 09163698 |
| Aug. 19, 2009 | (EP) | 09168194 |

(51) Int. Cl.
*H01M 2/16* (2006.01)
*B29C 47/00* (2006.01)
(Continued)

(52) U.S. Cl.
CPC ............... *B01D 71/26* (2013.01); *B01D 71/76* (2013.01); *B29C 47/00* (2013.01); *B32B 27/32* (2013.01); *H01M 2/14* (2013.01); *H01M 2/16* (2013.01); *H01M 2/164* (2013.01); *H01M 2/1653* (2013.01)

(58) Field of Classification Search
None
See application file for complete search history.

(56) References Cited

U.S. PATENT DOCUMENTS

| 5,084,534 A | 1/1992 | Welborn, Jr. et al. |
| 6,054,498 A | 4/2000 | Hasegawa et al. |

(Continued)

FOREIGN PATENT DOCUMENTS

| EP | 1870430 | * 12/2007 |
| EP | 1 947 138 A1 | 7/2008 |

(Continued)

OTHER PUBLICATIONS

Sun, T. et al., "Effect of Short Chain Branching on the Coil Dimensions of Polyolefins in Dilute Solutions," *Macromolecules*, 2001, vol. 34, No. 19, pp. 6812-6820 (1 page Abstract).

(Continued)

*Primary Examiner* — Ula C Ruddock
*Assistant Examiner* — Matthew Van Oudenaren
(74) *Attorney, Agent, or Firm* — DLA Piper LLP

(57) ABSTRACT

The invention relates to microporous membranes comprising polymer and having well-balanced permeability, shutdown temperature, and pin puncture strength. The invention also relates to methods for making such membranes, and the use of such membranes as battery separator film in, e.g., lithium ion secondary batteries. The membrane has a shutdown temperature <130.5° C.

6 Claims, 3 Drawing Sheets

Related U.S. Application Data application No. 61/164,824, filed on Mar. 30, 2009, provisional application No. 61/177,060, filed on May 11, 2009, provisional application No. 61/220,094, filed on Jun. 24, 2009.

(51) Int. Cl.
*H01M 10/02* (2006.01)
*H01M 10/26* (2006.01)
*H01M 4/64* (2006.01)
*B01D 71/26* (2006.01)
*B01D 71/76* (2006.01)
*B32B 27/32* (2006.01)
*H01M 2/14* (2006.01)

(56) References Cited

U.S. PATENT DOCUMENTS

| | | |
|---|---|---|
| 2005/0098913 A1 | 5/2005 | Funaoka et al. |
| 2007/0221568 A1* | 9/2007 | Nagashiki et al. ....... 210/500.36 |
| 2008/0057388 A1* | 3/2008 | Kono et al. ................... 429/144 |
| 2008/0057389 A1 | 3/2008 | Kono et al. |
| 2008/0193833 A1 | 8/2008 | Ohashi et al. |
| 2009/0008816 A1 | 1/2009 | Takita et al. |
| 2009/0226813 A1 | 9/2009 | Takita et al. |
| 2010/0316902 A1 | 12/2010 | Takita et al. |
| 2011/0117439 A1 | 5/2011 | Yamada et al. |

FOREIGN PATENT DOCUMENTS

| | | |
|---|---|---|
| JP | 11-269289 A | 10/1999 |
| JP | 2002-338730 A | 11/2002 |
| JP | 2003-231772 A | 8/2003 |
| JP | 2005-225919 A | 8/2005 |
| WO | 97/23554 A1 | 7/1997 |
| WO | 2007/052663 A1 | 5/2007 |
| WO | 2007/132942 A1 | 11/2007 |
| WO | 2008/026782 A1 | 3/2008 |
| WO | WO2008026782 * | 3/2008 |

OTHER PUBLICATIONS

US Official Action for U.S. Appl. No. 13/259,195 dated Oct. 15, 2013.

US Official Action dated Sep. 18, 2014 from related U.S. Appl. No. 13/259,172.

US Official Action dated May 30, 2014 from corresponding U.S. Appl. No. 13/259,172.

US Official Action dated Jun. 9, 2014 from corresponding U.S. Appl. No. 13/260,658.

US Official Action dated Jun. 9, 2014 from related U.S. Appl. No. 13/260,658.

US Official Action dated Jun. 20, 2014 from related U.S. Appl. No. 13/260,621.

US Official Action dated Dec. 18, 2015 from related U.S. Appl. No. 13/259,226.

* cited by examiner

MICROPOROUS MEMBRANES, METHODS FOR MAKING SUCH MEMBRANES, AND THE USE OF SUCH MEMBRANES AS BATTERY SEPARATOR FILM

CROSS-REFERENCE TO RELATED APPLICATIONS

This application claims priority from U.S. Provisional Application Ser. No. 61/177,060 filed May 11, 2009, and EP 09163698.5 filed Jun. 25, 2009; U.S. Provisional Application Ser. No. 61/164,824 filed Mar. 30, 2009, and EP 09160964.4 filed May 25, 2009; U.S. Provisional Application Ser. No. 61/164,817 filed Mar. 30, 2009, and EP 09160965.1 filed May 25, 2009; U.S. Provisional Application Ser. No. 61/164,833 filed Mar. 30, 2009, and EP 09160966.9 filed May 25, 2009; U.S. Provisional Application Ser. No. 61/164,827 filed Mar. 30, 2009, and EP 09160967.7 filed May 25, 2009; U.S. Provisional Application Ser. No. 61/220,094 filed Jun. 24, 2009, and EP 09168194.0 filed Aug. 19, 2009, the contents of each of which are incorporated by reference in their entirety.

FIELD OF THE INVENTION

The present invention relates to microporous membranes comprising polymer and having well-balanced permeability, shutdown temperature, and pin puncture strength. The invention also relates to methods for making such membranes, and the use of such membranes as battery separator film in, e.g., lithium ion secondary batteries.

BACKGROUND OF THE INVENTION

Microporous polyolefin membranes are useful as separators for primary and secondary batteries. Such batteries include lithium ion secondary batteries, lithium-polymer secondary batteries, nickel-hydrogen batteries, nickel-cadmium batteries, nickel-zinc batteries, silver-zinc batteries, etc. When a microporous polyolefin membrane is used as a separator for a lithium ion battery, the membrane's properties significantly affect the battery's performance. In particular, the microporous membrane's permeability, mechanical properties, shutdown properties, meltdown properties, etc., generally affect productivity and safety.

It is desirable for a battery to have a relatively low shutdown temperature and a relatively high meltdown temperature, which generally results in improved battery safety properties, particularly for high-capacity batteries exposed to relatively high temperatures during storage and/or use. High separator permeability is desirable for high battery capacity. A separator with relatively high mechanical strength is desirable because improving separator strength can result in improved battery assembly and fabrication efficiency.

In general, microporous membranes containing only polyethylene have a relatively low meltdown temperature of about 150° C. and a shutdown temperature of about 140° C., while microporous membranes containing only polypropylene have relatively high shutdown temperatures of about 155° C. and a meltdown temperature of about 165 to about 170° C. In addition, microporous membranes have been proposed which comprise both polyethylene and polypropylene.

Japanese Patent Application Nos. JP1999-269289A and JP2002-338730A disclose the optimization of the polymer used to produce the membrane in order to improve the membrane's properties. The references disclose using polyethylene producing with single site catalyst to improve the membrane's shutdown temperature. The membranes disclosed in the references have a relatively low shutdown temperature but also relatively poor air permeability.

Japanese Patent Application No. JP2003-231772A discloses a microporous membrane comprising polyethylene copolymer having Mv of from 100,000 to 5,000,000. The membrane has improved air permeability and strength, but the membrane's shutdown temperature is >137° C. Japanese Patent Application No. JP2005-225919A also discloses a microporous polyolefin membrane comprising polyethylene produced with metallocene catalyst to improve battery lifetime.

PCT Patent Application No. WO 07/52663 discloses a microporous membrane comprising a polyolefin composition having specified melting characteristics. The microporous polyolefin membrane has a relatively high air permeability but also a relatively high shutdown temperature.

While improvements have been made, membranes having relatively low shutdown temperature and relatively air permeability and high strength are desired.

SUMMARY OF THE INVENTION

In an embodiment, the invention relates to a microporous membrane comprising ≥1.0 wt. % of a first polyolefin having a $T_{80}$, as hereinafter defined, ≤130.0° C., a $T_{25}$, as hereinafter defined, ≥100.0° C., and $T_{80}-T_{25}$≤25.0° C. The wt. % is based on the weight of the membrane. Optionally, the membrane has a shutdown temperature ≤130.5° C.

In another embodiment, the invention relates to a method for making a microporous membrane comprising:
  (1) extruding a mixture of diluent and polymer, the polymer comprising 1.0 wt. % to 20.0 wt. % of a first polyethylene, having a $T_{80}$≤130.0° C., a $T_{25}$≥100.0° C., and wherein $T_{80}-T_{25}$≤25° C.;
  (2) stretching the extrudate in at least one planar direction; and
  (3) removing at least a portion of the diluent from the stretched extrudate.

In another embodiment the invention relates to the microporous membrane produced by the preceding process.

In another embodiment, the invention relates to a battery comprising an electrolyte, an anode, a cathode, and a separator situated between the anode and the cathode, wherein the separator comprises a microporous membrane of any preceding embodiment.

In yet another embodiment, the invention relates to the use of such a battery as a power source in, e.g., an electric vehicle, hybrid electric vehicle, power tool, computer, mobile phone, consumer electronics, etc.

DETAILED DESCRIPTION OF THE INVENTION

Figure 1:
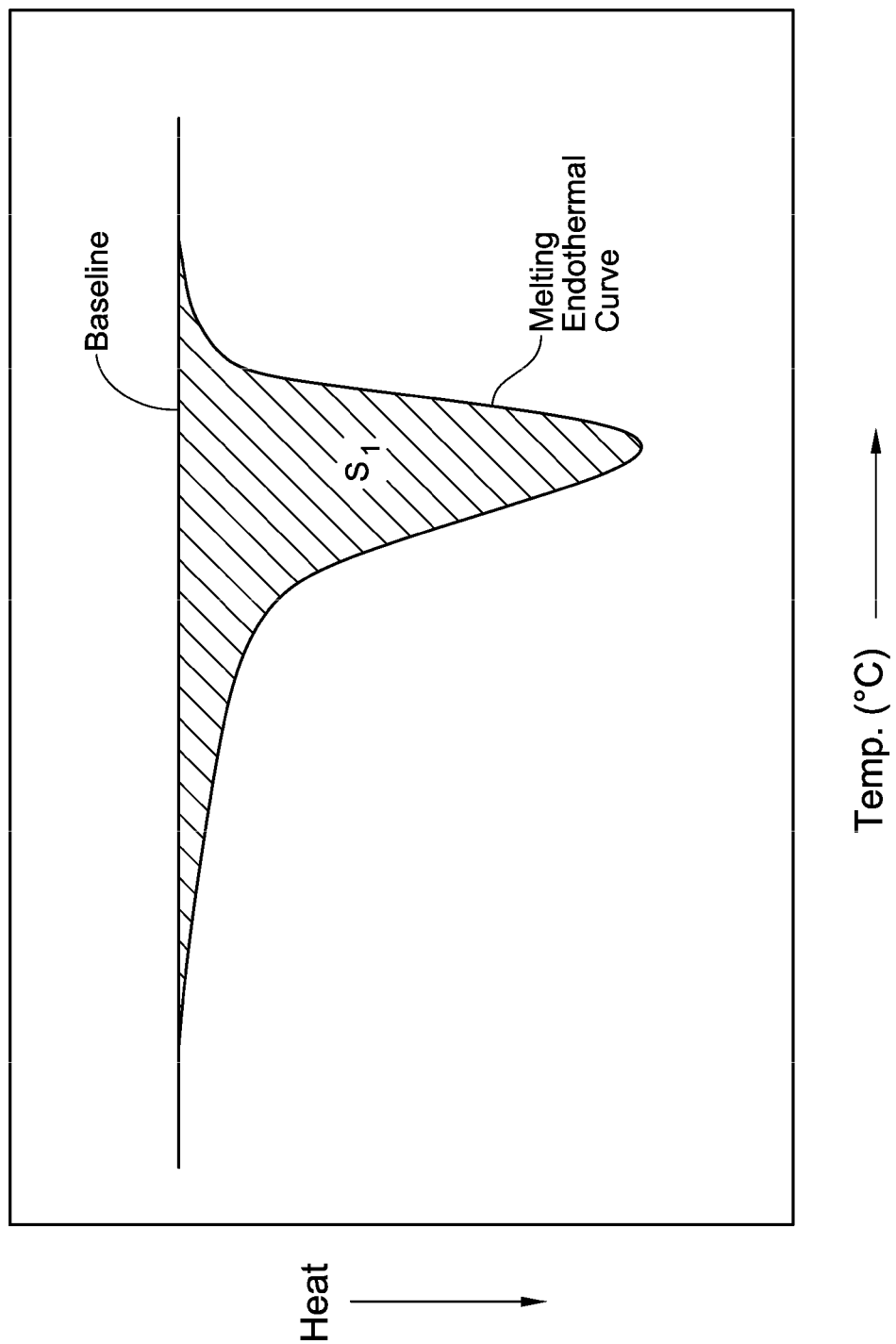
FIG. 1 illustrates a representative melting distribution (DSC) for a polyolefin.

The invention relates to a microporous membrane having improved a balance of permeability, shutdown temperature, and resistance to heat shrinkage. When a microporous film comprises polymer having a relatively low melting peak ("$T_m$"), e.g., ≤130.0° C., the membrane's shutdown temperature decreases and the membrane's air permeability increases as the amount of the polymer in the membrane increases. Prior art membranes having sufficiently low shutdown temperature also have undesirably low air permeability and/or undesirably high heat shrinkage. It has been discovered that this difficulty can be overcome by selecting a polymer having a relatively low $T_m$ and a relatively narrow melting distribution. Microporous membranes containing such polymers have a shutdown temperature $\leq 130°$ C., a normalized pin puncture strength $\geq 150$ gf/20 μm at 50% membrane porosity, a normalized air permeability $\leq 6 \times 10^2$ seconds/100 cm$^3$/20 μm, and a 105° C. heat shrinkage in at least one planar direction $\leq 10\%$.

[1] Composition of Materials Used to Produce the Microporous Polyolefin Membrane In an embodiment the microporous polyolefin membrane is made by extruding a mixture of polymer and diluent. The diluent can be a solvent for the polymer. When the polymer is soluble in or miscible with the diluent, the polymer-diluent mixture can be called a polymeric solution. When the polymer is polyolefin and the diluent is liquid paraffin, the mixture can be called a polyolefin solution. When the polymer is a combination of polymers, e.g., a combination of polyolefins, it can be called a polymeric mixture, e.g., a polyolefin mixture. The polymer can be a mixture of individual polymer components or a reactor blend, for example. In an embodiment, the membrane is produced from diluent and a mixture of polyolefin, where the diluent is a solvent for the polyolefin mixture such as liquid paraffin. Examples of polyolefin useful in this embodiment will now be described in more detail. While the invention is described in terms of these embodiments, it is not limited thereto, and the description of these embodiments is not meant to foreclose other embodiments within the broader scope of the invention.

(1) Polyethylene Resin(s)

In an embodiment, the polyolefin used to produce the microporous membrane comprises polyethylene or a mixture of polyethylenes. In an embodiment, the polyethylene comprises (a) a first polyethylene and (b) a second polyethylene; the first polyethylene, the second polyethylene and (c) a third polyethylene having a lower molecular weight than the second polyethylene; or the first polyethylene and the third polyethylene. The weight-average molecular weight ("Mw") of the combined polyethylene is not critical, and can range, e.g., from about $1 \times 10^4$ to about $1 \times 10^7$, or from about $1 \times 10^5$ to about $5 \times 10^6$, or from about $2 \times 10^5$ to about $3 \times 10^6$. In an embodiment, the polymer used to produce the microporous membrane comprises $\geq 50$ wt % of polyethylene, based on the weight of the membrane. In another embodiment, the polymer used to produce the microporous membrane consists essentially of polyethylene (including polyethylene copolymer). In yet another embodiment, the polymer used to produce the microporous membrane consists of polyethylene (i.e., the polymer contains polyethylene or polyethylene copolymer only).

In an embodiment, the microporous membrane comprises $\geq 50$ wt. % polyethylene, based on the weight of the membrane. The polyethylene used to produce the microporous membrane can comprise polyolefin (homopolymer or copolymer) containing recurring ethylene units. Optionally, the polyethylene comprises polyethylene homopolymer and/or polyethylene copolymer wherein at least 85% (by number) of the recurring units are ethylene units.

(a) The First Polyethylene

The first polyethylene comprises an ethylene-based polyolefin homopolymer or copolymer having a $T_{80} \leq 130.0°$ C., a $T_{25} \geq 100.0°$ C., and $T_{80} - T_{25} \leq 25.0°$ C.

The $T_{80}$ and $T_{25}$ temperatures are characteristics of the polymer resulting from the polymer's structure and composition. For example, some of the factors influencing $T_{80}$ and $T_{25}$ include the molecular weight, molecular weight distribution, branching ratio, the molecular weight of branched chains, the amount of comonomer (if any), comonomer distribution along the polymer chains, the size and distribution of polyethylene crystals in the polyethylene and crystal lattice regularity. Optionally, $T_{80}$ is in the range of from 120.0° C. to 129.0° C., such as from about 120.0° C. to about 126.0° C. When $T_{80}$ is >130.0° C., it is more difficult to reduce the membrane's shutdown temperature without also reducing the membrane's air permeability. When $T_{25}$ is <100.0° C., it is more difficult to produce a membrane having sufficient strength for use as a battery separator film.

Optionally, the first polyethylene has Tm in the range of from 120.0° C. to 129.0° C., e.g., in the range of from 120.0° C. to 128.0° C., such as from 120.0° C. to 126.0° C., or 121.0° C. to 124.0° C., or 122.0° C. to 126.0° C. When the $T_m$ is $\leq 115°$ C., it is more difficult to produce a thermally-stable membrane (one having low heat shrinkage, for example) without also reducing membrane permeability. Thermal treatment temperatures (e.g., heat setting temperatures) >115° C. are generally used to produce thermally-stable membranes, and membrane permeability decreases when the heat setting temperature is $\geq$ the polymer's $T_m$.

Figure 2:
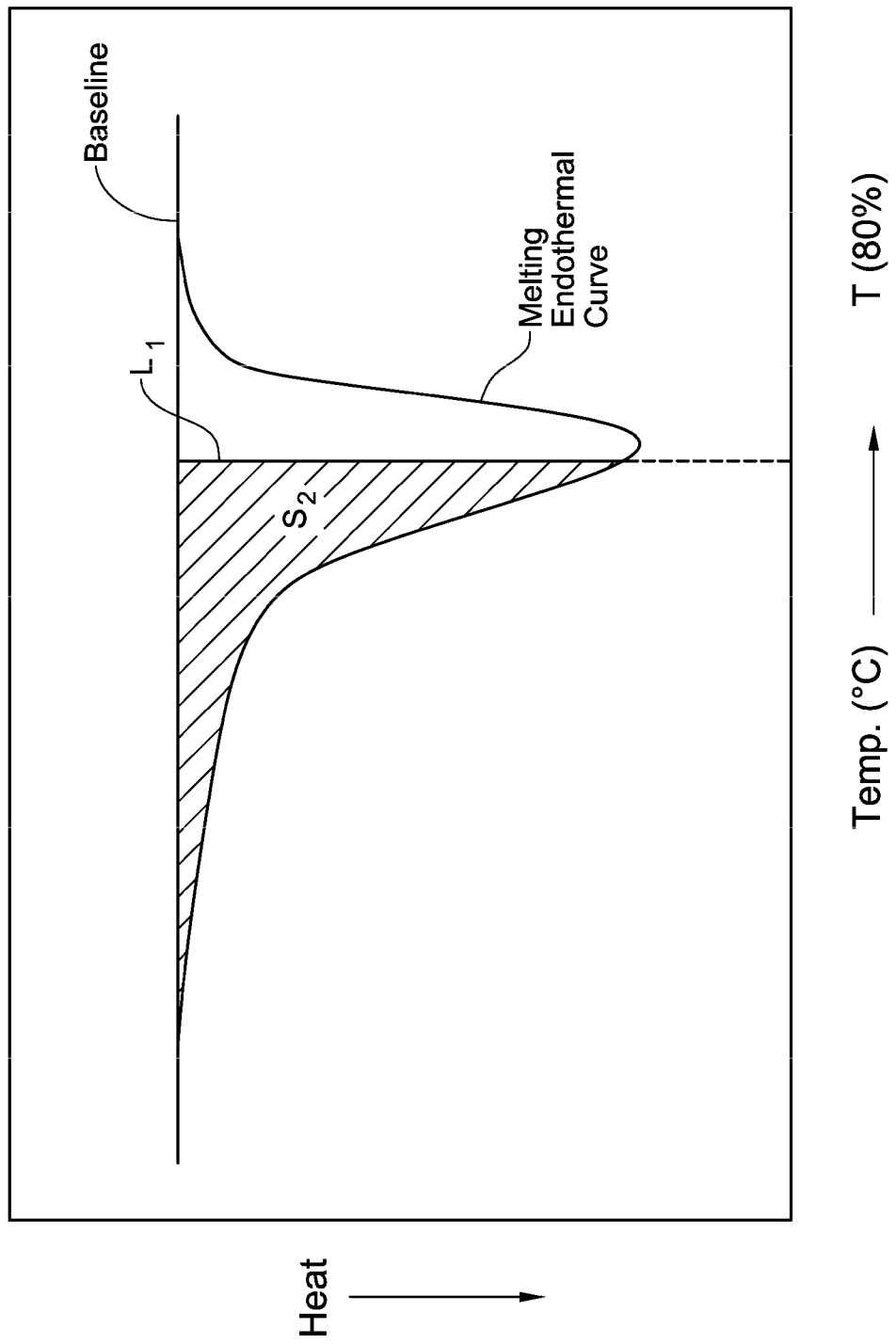
FIG. 2 illustrates the $T_{80}$ temperature of the melting distribution.

Polyethylene heat of fusion ($\Delta H_m$) and $T_m$ are measured in accordance with JIS K7122 as follows. A sample of the first polyethylene is prepared as a 0.5-mm-thick molding that is melt-pressed at 210° C. and then stored for about 24 hours while exposed to a temperature of about 25° C. The sample is then placed in a sample holder of a differential scanning calorimeter (Pyris Diamond DSC available from Perkin Elmer, Inc.) and exposed to a temperature of 25° C. in a nitrogen atmosphere. The sample is then exposed to an increasing temperature (the first heating cycle) at a rate of 10° C./minute until a temperature of 230° C. is reached. The sample is exposed to the 230° C. temperature for 1 minute and then exposed to a decreasing temperature at a rate of 10° C./minute until a temperature of 30° C. is reached. The sample is exposed to the 30° C. temperature for 1 minute, and is then exposed to an increasing temperature at a rate of 10° C./minute (the second heating cycle) until a temperature of 230° C. is reached. The DSC records the amount of heat flowing to the sample during the second heating cycle. Tm is the temperature of the maximum heat flow to the sample as recorded by the DSC in the temperature range of 30° C. to 200° C. Polyethylene may show secondary melting peaks adjacent to the principal peak, and/or the end-of-melt transition, but for purposes herein, such secondary melting peaks are considered together as a single melting point, with the highest of these peaks being considered the Tm. As shown in FIG. 1, the amount of heat is calculated from an area $S_1$ of a region (shown by hatching) enclosed by a DSC curve (melting endotherm curve) obtained in the course of temperature elevation and a baseline. The heat of fusion ($\Delta H_m$ units: J/g) is obtained by dividing the total amount of heat supplied to the sample (unit: J) by the weight (unit: g) of the sample. $T_{80}$ is defined as the temperature, at which the area $S_2$ of the lower-temperature region (shown by hatching) bounded by a straight line $L_1$ perpendicular to the temperature axis reaches 80% of the area $S_1$, as shown in FIG. 2.

Figure 3:
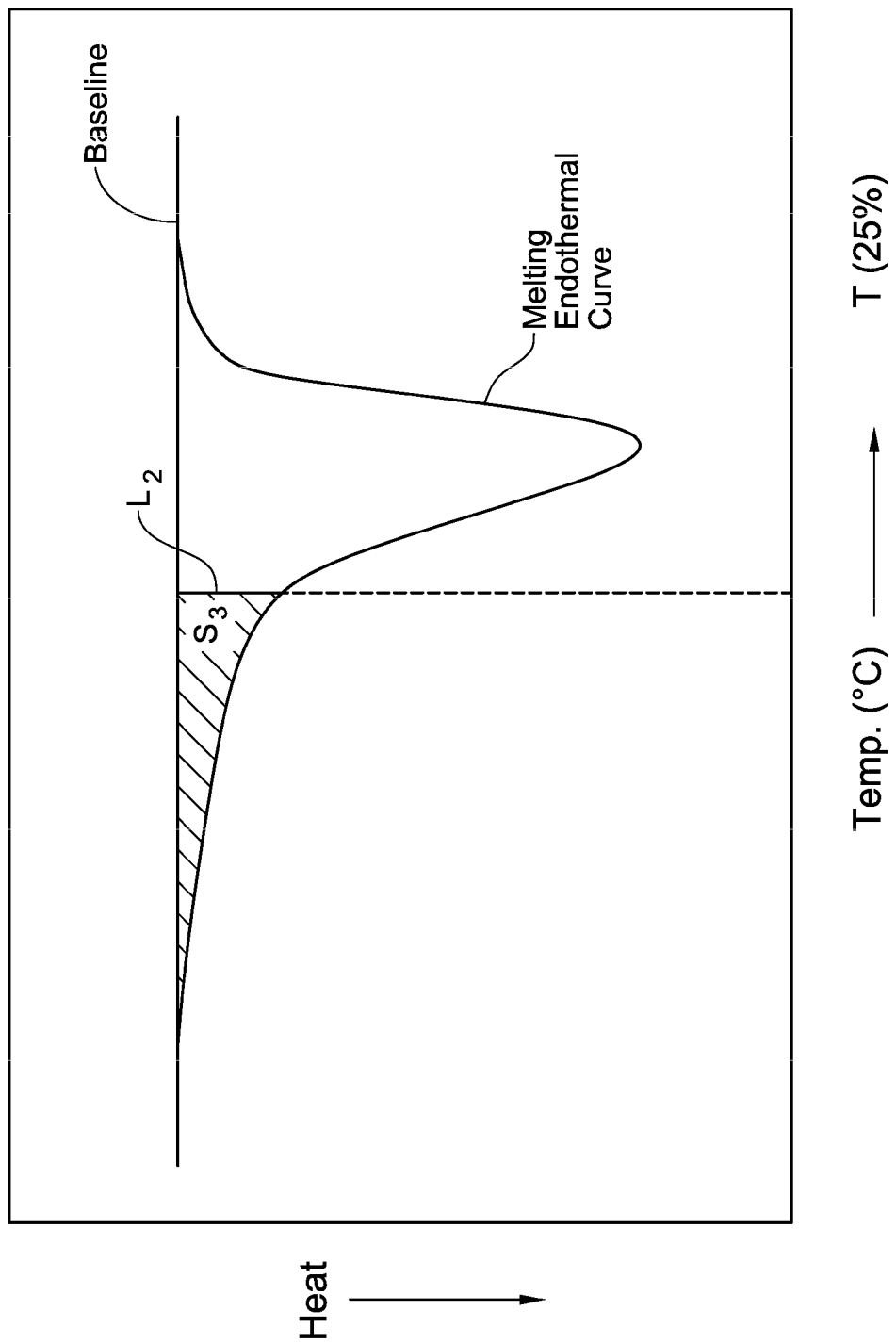
FIG. 3 illustrates the $T_{25}$ temperature of the melting distribution.

$T_{25}$ is also determined from the polyethylene's DSC curve, measured under the same conditions as is used to measure $T_{80}$. See FIGS. 1-3. $T_{25}$ is defined as the temperature, at which an area $S_3$ of the lower-temperature region of the DSC curve (shown by hatching) bounded by a straight line $L_2$ perpendicular to the temperature axis reaches 25% of the area $S_1$.

In an embodiment, the first polyethylene has an Mw≤4.0× $10^5$, e.g., in the range of from about $1.0\times10^4$ to $4.0\times10^5$, for example from about $1.5\times10^4$ to about $3.0\times10^5$, such as from about $2.0\times10^4$ to about $1.5\times10^5$. Optionally, the first polyethylene has a molecular weight distribution ("MWD" defined as Mw/Mn)≤50, e.g., in the range of from about 1 to about 50, such as from about 1 to about 10, preferably from 1.5 to 5.0. In an embodiment, the first polyethylene comprises copolymer of ethylene and a comonomer such as alpha-olefin. The comonomer is generally present in a relatively small amount compared to the amount of ethylene. For example, the comonomer amount is generally less than 10% by mole based on 100% by mole of the copolymer, such as from 1.0% to 5.0% by mol. The comonomer can be, for example, one or more of propylene, butene-1, pentene-1, hexene-1, 4-methylpentene-1, octene-1, vinyl acetate, methyl methacrylate, styrene, or other monomers. Such a polymer or copolymer can be produced using any suitable catalyst, such as a single-site catalyst. For example, the polymer can be produced according to the methods disclosed in U.S. Pat. No. 5,084,534 (such as the methods disclosed therein in examples 27 and 41), which is incorporated by reference herein in its entirety.

In an embodiment, the amount of the first polyethylene used to produce the membrane is ≥1.0 wt. % based on the weight of the polymer used to produce the membrane, such as from about 1.0 wt. % to about 20.0%, or about 4.0 wt. % to about 17.0 wt. %, or 8.0 wt. % to 13.0 wt. %.

In an embodiment, the value of $T_{80}-T_{25}$ of the first polyethylene is less than about 20.0° C., e.g., in the range of about 5.0° C. to 18.0° C. When the value of $T_{80}-T_{25}$ of the first polyethylene is ≤15.0° C., and Mw of the first polyethylene is ≥$1.0\times10^5$, a greater amount of the first polyethylene is generally needed (such as ≥10.0 wt. % based on the total weight of polymer in the membrane, e.g., in the range of 10.0 wt. % to 30.0 wt. %) to produce a membrane having shutdown temperature <130.5° C.

(b) The Second Polyethylene

In an embodiment, the second polyethylene has an Mw>$1.0\times10^6$, e.g., in the range of $1.1\times10^6$ to about $5\times10^6$, for example from about $1.2\times10^6$ to about $3\times10^6$, such as about $2\times10^6$. Optionally, the second polyethylene has an MWD≤$1.0\times10^2$, e.g., from about 2.0 to 100.0, such as from about 4 to about 20 or about 4.5 to about 10.0. For example, the second polyethylene can be an ultra-high molecular weight polyethylene ("UHMWPE"). In an embodiment, the second polyethylene is at least one of (i) an ethylene homopolymer or (ii) a copolymer of ethylene and ≤10 mol. % of a comonomer, based on 100% by mole of the copolymer. The comonomer can be, for example, one or more of propylene, butene-1, pentene-1, hexene-1,4-methylpentene-1, octene-1, vinyl acetate, methyl methacrylate, styrene, or other comonomer.

The second polyethylene can be produced using any convenient polymerization process, including those using a Ziegler-Natta polymerization catalyst.

In an embodiment, the amount of the second polyethylene is ≤99.0 wt. %, based on the total weight of polymer used to produce the membrane. For example, the amount of second polyethylene can be in the range of from 0 wt. % to 74.0 wt. %, e.g., from about 1.0 wt. % to about 46.0 wt. %, such as from about 7.0 wt. % to about 32.0 wt. %.

(c) The Third Polyethylene

The third polyethylene has a $T_{80}>132.0°$ C. and has an Mw≤$1.0\times10^6$, e.g., in the range of from $1.0\times10^5$ to $9.0\times10^5$, such as from about $4\times10^5$ to about $8\times10^5$. Optionally, the third polyethylene has an MWD≤$1.0\times10^2$, e.g., in the range of from 1 to about $1.0\times10^2$, such as from about 3 to about 20. For example, the third polyethylene can be one or more of a high density polyethylene ("HPDE"), a medium density polyethylene, a branched low density polyethylene, or a linear low density polyethylene. Optionally, the third polyethylene has terminal unsaturation. For example, the third polyethylene can have an amount of terminal unsaturation ≥0.20 per 10,000 carbon atoms, e.g., ≥5.0 per 10,000 carbon atoms, such as ≥10.0 per 10,000 carbon atoms. The amount of terminal unsaturation can be measured in accordance with the procedures described in PCT Patent Publication No. WO97/23554, for example. In another embodiment, the third polyethylene is HDPE having an amount of terminal unsaturation <0.20 per 10,000 carbon atoms.

In an embodiment, the third polyethylene is at least one of (i) an ethylene homopolymer or (ii) a copolymer of ethylene and ≤10.0 mol. % of a comonomer, based on 100% by mole of the copolymer The comonomer can be, for example, one or more of propylene, butene-1, pentene-1, hexene-1,4-methylpentene-1, octene-1, vinyl acetate, methyl methacrylate, styrene, or other comonomer.

In an embodiment, the amount of third polyethylene is ≤99 wt. %, e.g., in the range of from 25.0 wt. % to 99.0 wt. %, e.g., 50.0 wt. % to 95.0 wt. %, or 60.0 wt. % to 85.0 wt. %, based on the total weight of polymer used to produce the membrane.

The third polyethylene can be produced using any suitable catalyst, including single site polymerization catalysts.

(d) The First Polyethylene, the Second Polyethylene, and the Third Polyethylene

In an embodiment, the membrane is produced from the first, second, and third polyethylenes. When the first, second, and third polyethylenes are used, the MWD of the polyethylene mixture in the polymer-diluent mixture can be controlled by conventional methods, e.g., by regulating the relative amounts and MWDs of the resins in the mixture, or by regulating reactor blend process conditions. In an embodiment, the third polyethylene is a high-density polyethylene. The relative amount of the second polyethylene and the third polyethylene is not critical. For example, the relative amount of the second polyethylene in the combined third and second polyethylene can be, e.g., ≥1.0 wt. %, or in the range of from 1.0 wt. % to 60.0 wt. %, based on the combined weight of the second polyethylene and the third polyethylene, with the balance being the third polyethylene.

(e) Molecular Weight Distribution MWD

The MWD of the combined polyethylene can be in the range from 5.0 to about $3.0\times10^2$, or from 5.0 to about 100 or from about 10 to about 30. Although it is not critical, when the MWD is <5.0, extrusion can be more difficult and it can be more difficult to make a microporous polyolefin membrane having acceptable thickness uniformity. On the other hand, when the MWD is >$3.0\times10^2$, it can be more difficult to make a microporous membrane having sufficient strength. The MWD of polyolefin or a mixture of polyolefins can be controlled, e.g., by using multi-stage polymerization.

Polyethylene Mw and MWD is determined using a High Temperature Size Exclusion Chromatograph, or "SEC", (GPC PL 220, Polymer Laboratories), equipped with a differential refractive index detector (DRI). Three PLgel Mixed-B columns available from (available from Polymer Laboratories) are used. The nominal flow rate is 0.5 cm³/min, and the nominal injection volume is 300 µL. Transfer lines, columns, and the DRI detector are contained in an oven maintained at 145° C. The measurement is made in accordance with the procedure disclosed in "Macromolecules, Vol. 34, No. 19, pp. 6812-6820 (2001)".

The GPC solvent used is filtered Aldrich reagent grade 1,2,4-Trichlorobenzene (TCB) containing approximately 1000 ppm of butylated hydroxy toluene (BHT). The TCB is degassed with an online degasser prior to introduction into the SEC. Polymer solutions are prepared by placing dry polymer in a glass container, adding the desired amount of the above TCB solvent, then heating the mixture at 160° C. with continuous agitation for about 2 hours. The concentration of polymer in the solution is 0.25 to 0.75 mg/ml. Sample solution is filtered off-line before injecting to GPC with 2 μm filter using a model SP260 Sample Prep Station (available from Polymer Laboratories).

The separation efficiency of the column set is calibrated with a calibration curve generated using a seventeen individual polystyrene standards ranging in Mp ("Mp" being defined as the peak in Mw) from about 580 to about 10,000,000. The polystyrene standards are obtained from Polymer Laboratories (Amherst, Mass.). A calibration curve (log Mp vs. retention volume) is generated by recording the retention volume at the peak in the DRI signal for each PS standard and fitting this data set to a 2nd-order polynomial. Samples are analyzed using IGOR Pro, available from Wave Metrics, Inc.

(2) Additional Polymer

In addition to the polyethylene resin(s), the polyolefin mixture can optionally contain additional polymers such as a fourth polyolefin. The fourth polyolefin can be one or more homopolymer or copolymer of, e.g., polypropylene, polybutene-1, polypentene-1, poly-4-methylpentene-1, polyhexene-1, polyoctene-1, polyvinyl acetate, polymethyl methacrylate, polystyrene, etc. Optionally, the fourth polyolefin has an Mw in the range of about $1 \times 10^4$ to about $4 \times 10^6$. When used, the amount of the fourth polyolefin is generally in the range of <20.0 wt. %, based on the weight of the polymer used to produce the microporous membrane, such as in the range of 0.5 wt. % to 10.0 wt. %. The polyolefin composition can also contain a polyethylene wax, e.g., one having an Mw of about $1 \times 10^3$ to about $1 \times 10^4$. When used, the amount of polyethylene wax is generally < about 20.0% wt. % of the combined weight of the first second and third polymers and the polyethylene wax used to produce the microporous membrane. In an embodiment, the amount of polyethylene wax is <10.0 wt. %, such as in the range of 0.5 wt. % to 10 wt. %. When used, the amount of fourth polymer and/or polyethylene wax is not critical provided they are not used in an amount that would cause significant deterioration of the properties of the microporous polyolefin membrane. In an embodiment, the fourth polymer is polypropylene having an Mw≥$1.0 \times 10^6$ and a heat of fusion (second melt) ≥90 J/g. Suitable polypropylenes are described in PCT Patent Publication No. WO2007/132942, which is incorporated by reference herein in its entirety.

[2] Production Method of Microporous Membrane

In an embodiment, the microporous membrane is a monolayer (i.e., single-layer) membrane produced from the extrudate. The extrudate can be produced from polyolefin and diluent as follows.

In an embodiment, the microporous membrane is produced by a process comprising: (1) combining polyolefin and diluent; (2) extruding the combined polyolefin-diluent mixture through a die to form an extrudate; (3) optionally cooling the extrudate to form a cooled extrudate, e.g., a gel-like sheet; (4) stretching the extrudate in the transverse direction (TD), the machine direction (MD), or both; (5) removing at least a portion of the membrane-forming solvent from the extrudate or cooled extrudate to form a membrane; (6) optionally removing at least a portion of any remaining volatile species from the membrane; (7) optionally stretching the dried membrane in MD from a first dry length to a second dry length larger than the first dry length by a magnification factor in the range of from about 1.1 to about 1.5 and stretching the membrane in TD from a first dry width to a second dry width that is larger than the first dry width by a magnification factor in the range of from about 1.1 to about 1.3; and then optionally decreasing the second dry width to a third dry width, the third dry width being in the range of from the first dry width to about 1.1 times larger than the first dry width.

An optional hot solvent treatment step, an optional thermal treatment step (e.g., heat setting and/or annealing), an optional cross-linking step with ionizing radiation, and an optional hydrophilic treatment step, etc., as described in PCT Patent Publication No. WO2008/016174 can be conducted if desired. Neither the number nor order of the optional steps is critical.

(1) Combining Polyolefin and Diluent

The polyolefin mixture as described above can be combined, e.g., by dry mixing or melt blending, and then the polyolefin mixture can be combined with at least one diluent to produce a polyolefin-diluent mixture, e.g., a polyolefin solution. Alternatively, the polyolefin mixture and diluent can be combined in a single step. The resins and solvents can be added sequentially, in parallel, or in a combination thereof. Alternatively, a polyolefin mixture can produced by first combining at least a portion of the resins to make a polyolefin composition, and then combining the polyolefin composition with at least one membrane-forming solvent (and optionally additional portions of the resins and/or additional resins) to produce a polyolefin solution. Optionally, the polyolefin solution contains additives such as one or more of antioxidant, fine silicate powder (pore-forming material), etc. The amount of such additives is not critical, provided they are not present in amounts large enough to adversely affect the membrane's properties. Generally, the amount of such additives in aggregate does not exceed 1 wt. %, based on the weight of the polyolefin solution.

The use of a diluent comprising a liquid membrane-forming solvent can make it less difficult to conduct stretching at relatively high magnifications. The liquid solvents can be, for example, aliphatic, alicyclic or aromatic hydrocarbons such as nonane, decane, decalin, p-xylene, undecane, dodecene; liquid paraffin; mineral oil distillates having boiling points comparable to those of the above hydrocarbons; and phthalates liquid at room temperature, such as dibutyl phthalate, dioctyl phthalate, etc. The use of a non-volatile solvent such as liquid paraffin can make it easier to obtain a gel-like molding (or gel-like sheet) having a stable solvent content. In an embodiment, one or more solid solvents, which are miscible with the polyolefin solution or polyolefin composition during melt-blending but solid at room temperature, may be added to the liquid solvent. Such solid solvents can be, e.g., stearyl alcohol, ceryl alcohol, paraffin waxes, etc. Solid solvent can be used without liquid solvent, but in this case it can be more difficult to evenly stretch the gel-like sheet during step (4).

In an embodiment, the viscosity of the liquid solvent ranges from about 30 cSt to about 500 cSt, or from about 30 cSt to about 200 cSt, when measured at a temperature of 25° C. Although the choice of viscosity is not particularly critical, when the viscosity at 25° C. is less than about 30 cSt, the polyolefin solution might foam, resulting in difficulty in blending. On the other hand, when the viscosity is more than about 500 cSt, it can be more difficult to remove the solvent during step (5). The polyolefin solution can contain additives such as one or more antioxidant. In an embodiment, the amount of such additives does not exceed 1 wt. % based on the weight of the polyolefin solution.

The amount of membrane-forming solvent used to produce the extrudate is not critical, and can be in the range, e.g., of from about 25 wt. % to about 99 wt. % based on the weight of the combined membrane-forming solvent and polyolefin composition with the balance being polymer, e.g., the combined first, second, and third polyethylene.

(2) Extruding

In an embodiment, the combined polyolefin composition and the diluent (a membrane-forming solvent in this case) are conducted from an extruder to a die.

The extrudate or cooled extrudate should have an appropriate thickness to produce, after the stretching steps, a final membrane having the desired thickness (generally 3 μm or more). For example, the extrudate can have a thickness in the range of about 0.1 mm to about 10 mm, or about 0.5 mm to 5 mm. Extrusion is generally conducted with the mixture of polyolefin composition and membrane-forming solvent in the molten state. When a sheet-forming die is used, the die lip is generally heated to an elevated temperature in the range of about $T_m$ to $T_m+80°$ C., e.g., in the range of 140° C. to 250° C. or 140° C. to 200° C. Suitable process conditions for accomplishing the extrusion are disclosed in PCT Patent Publication Nos. WO 2007/132942 and WO 2008/016174. The machine direction ("MD") is defined as the direction in which the extrudate is produced from the die. The transverse direction ("TD") is defined as the direction perpendicular to both MD and the thickness direction of the extrudate. The extrudate can be produced continuously from a die, or it can be produced from the die in portions (as is the case in batch processing) for example, which can be conducted away from the process for storage, later use in the process, or further processing. The definitions of TD and MD are the same in both batch and continuous processing.

(3) Optional Extrudate Cooling

The extrudate can be exposed to a temperature in the range of 5° C. to 40° C. to form a cooled extrudate. Cooling rate is not particularly critical. For example, the extrudate can be cooled at a cooling rate of at least about 30° C./minute until the temperature of the extrudate (the cooled temperature) is approximately equal to the extrudate's gelation temperature (or lower). Process conditions for cooling can be the same as those disclosed in PCT Patent Publication Nos. WO 2008/016174 and WO 2007/132942, for example.

(4) Stretching the Extrudate

The extrudate or cooled extrudate is stretched in at least one direction. The extrudate can be stretched by, for example, a tenter method, a roll method, an inflation method or a combination thereof, as described in PCT Patent Publication No. WO 2008/016174, for example. The stretching may be conducted monoaxially or biaxially, though the biaxial stretching is preferable. In the case of biaxial stretching, any of simultaneous biaxial stretching, sequential stretching or multi-stage stretching (for instance, a combination of the simultaneous biaxial stretching and the sequential stretching) can be used, though simultaneous biaxial stretching is preferable. When biaxial stretching is used, the amount of magnification need not be the same in each stretching direction.

The stretching magnification factor can be, for example, 2 fold or more, preferably 3 to 30 fold in the case of monoaxial stretching. In the case of biaxial stretching, the stretching magnification factor can be, for example, 3 fold or more in any direction (e.g., in the range of 3 fold to 30 fold), such as 16 fold or more, e.g., 25 fold or more, in area magnification. An example of this stretching step includes stretching from about 9 fold to about 49 fold in area magnification. Again, the amount of stretch in each direction need not be the same. The magnification factor operates multiplicatively on film size. For example, a film having an initial width (TD) of 2.0 cm that is stretched in TD to a magnification factor of 4 fold will have a final width of 8.0 cm. The machine direction ("MD") is a direction in the plane of the film (the extrudate in this instance) which is oriented approximately along the direction of travel as the film is formed, i.e., the longest axis of the film during production. The transverse direction ("TD") also lies in the plane of the film and is approximately perpendicular to both the machine direction and a third axis approximately parallel to the thickness of the film.

While not required, the stretching can be conducted while exposing the extrudate to a temperature (the "stretching temperature") in the range of from about Tcd to Tm, where in this instance Tcd and Tm are the crystal dispersion temperature and melting peak of the polyethylene having the lowest melting peak among the polyethylenes used to produce the extrudate (usually the first polyethylene). The crystal dispersion temperature is determined by measuring the temperature characteristics of dynamic viscoelasticity according to ASTM D 4065. In an embodiment where Tcd is in the range of about 90° C. to 100° C., the stretching temperature can be from about 90.0° C. to 125.0° C.; e.g., from about 100° C. to 125° C., such as from 105° C. to 125° C. Optionally, the stretching temperature is ≤(Tm−10° C.).

In an embodiment, the stretched extrudate undergoes an optional thermal treatment before diluent removal. In the thermal treatment, the stretched extrudate is exposed to a temperature that is higher (warmer) than the temperature to which the extrudate is exposed during stretching. The planar dimensions of the stretched extrudate (length in MD and width in TD) can be held constant while the stretched extrudate is exposed to the higher temperature. Since the extrudate contains polyolefin and diluent, its length and width are referred to as the "wet" length and "wet" width. In an embodiment, the stretched extrudate is exposed to a temperature in the range of 120.0° C. to 125.0° C. for a time sufficient to thermally treat the extrudate, e.g., a time in the range of 1 second to 100 seconds while the wet length and wet width are held constant, e.g., by using tenter clips to hold the stretched extrudate along its perimeter. In other words, during the thermal treatment, there is no magnification or demagnification (i.e., no dimensional change) of the stretched extrudate in MD or TD.

In this step and in other steps such as dry orientation and heat setting where the sample (e.g., the extrudate, dried extrudate, membrane, etc.) is exposed to an elevated temperature, this exposure can be accomplished by heating air and then conveying the heated air into proximity with the sample. The temperature of the heated air, which is generally controlled at a set point equal to the desired temperature, is then conducted toward the sample through a plenum for example. Other methods for exposing the sample to an elevated temperature, including conventional methods such as exposing the sample to a heated surface, infra-red heating in an oven, etc., can be used with or instead heated air.

(5) Diluent Removal

In an embodiment, at least a portion of the diluent is removed (or displaced) from the stretched extrudate to form a dried membrane. A displacing (or "washing") solvent can be used to remove (wash away, or displace) the diluent, as described in PCT Patent Publication No. WO 2008/016174, for example.

(6) Drying the Membrane

In an embodiment, at least a portion of any remaining volatile species (e.g., washing solvent) is removed from the dried membrane after diluent removal. Any method capable of removing the washing solvent can be used, including conventional methods such as heat-drying, wind-drying (moving air), etc. Process conditions for removing volatile species such as washing solvent can be the same as those disclosed in PCT Patent Publication No. WO 2008/016174, for example.

(7) Thermal Treatment

In am embodiment, the membrane is subjected to a thermal treatment such as heat setting. During heat-setting, the membrane is, e.g., exposed to a temperature in the range of from about Tcd to about Tm, for example from 90.0° C. to 130.0° C., from about 100° C. to 128° C. or 105° C. to 125° C. In this instance Tm is the melting peak of the polymer having the lowest melting peak among the polymers used to produce the membrane, e.g., the first polyethylene.

(8) Stretching the Membrane (Dry Orientation)

Optionally, the dried membrane of the step (6) can be stretched (called "dry stretching" since at least a portion of the diluent has been removed or displaced) in at least one direction between the step (6) and (7). A dried membrane that has been dry stretched is called an "oriented" membrane. Before dry stretching, the dried membrane has an initial size in MD (a first dry length) and an initial size in TD (a first dry width). As used herein, the term "first dry width" refers to the size of the dried membrane in the TD prior to the start of dry orientation. The term "first dry length" refers to the size of the dried membrane in the MD prior to the start of dry orientation. Tenter stretching equipment of the kind described in WO 2008/016174 can be used, for example.

The dried membrane can be stretched in MD from the first dry length to a second dry length that is larger than the first dry length by a magnification factor (the "MD dry stretching magnification factor") in the range of from about 1.1 to about 1.5. When TD dry stretching is used, the dried membrane can be stretched in TD from the first dry width to a second dry width that is larger than the first dry width by a magnification factor (the "TD dry stretching magnification factor"). Optionally, the TD dry stretching magnification factor is ≤ the MD dry stretching magnification factor. The TD dry stretching magnification factor can be in the range of from about 1.1 to about 1.3. The dry stretching (also called re-stretching since the membrane-forming solvent—containing extrudate has already been stretched) can be sequential or simultaneous in MD and TD. Since TD heat shrinkage generally has a greater effect on battery properties than does MD heat shrinkage, the amount of TD magnification generally does not exceed the amount of MD magnification. When TD dry stretching is used, the dry stretching can be simultaneous in MD and TD or sequential. When the dry stretching is sequential, generally MD stretching is conducted first followed by TD stretching.

The dry stretching can be conducted while exposing the dried membrane to a temperature ≤Tm, e.g., in the range of from about Tcd−30° C. to Tm. In this instance Tm is the melting peak of the polymer having the lowest melting peak among the polymers used to produce the membrane, e.g., the first polyethylene. In an embodiment, the stretching temperature is conducted with the membrane exposed to a temperature in the range of from about 70.0 to about 130.0° C., for example from about 80° C. to about 129.0° C. In an embodiment, the MD stretching is conducted before TD stretching, and (i) the MD stretching is conducted while the membrane is exposed to a first temperature in the range of Tcd−30° C. to about Tm−10° C., for example 70.0° C. to 129.0° C., or about 80° C. to about 125° C. and (ii) the TD stretching is conducted while the membrane is exposed to a second temperature that is higher than the first temperature but lower than Tm, for example 70.0° C. to 129.0° C., or about 105° C. to about 125° C., or about 110° C. to about 120° C.

In an embodiment, the total MD dry stretching magnification factor is in the range of from about 1.1 to about 1.5, such as 1.2 to 1.4; the total TD dry stretching magnification factor is in the range of from about 1.1 to about 1.3, such as 1.15 to 1.25; the MD dry stretching is conducted before the TD dry stretching, the MD dry stretching is conducted while the membrane is exposed to a temperature in the range of 80.0° C. to about 120.0° C., and the TD dry stretching is conducted while the membrane is exposed to a temperature in the range of 115.0° C. to about 130.0° C., but less than Tm.

The stretching rate is preferably 3%/second or more in the stretching direction (MD or TD), and the rate can be independently selected for MD and TD stretching. The stretching rate is preferably 5%/second or more, more preferably 10%/second or more, e.g., in the range of 5%/second to 25%/second. Though not particularly critical, the upper limit of the stretching rate is preferably 50%/second to prevent rupture of the membrane.

(9) Controlled Reduction of the Membrane's Width (Heat-Relaxing of the Membrane)

Following the dry stretching, the dried membrane is optionally subjected to a controlled reduction in width from the second dry width to a third dry width, the third dry width being in the range of from the first dry width to about 1.1 times larger than the first dry width. The width reduction generally conducted while the membrane is exposed to a temperature ≥Tcd−30° C., but no greater than Tm of the first polyethylene. For example, during width reduction the membrane can be exposed to a temperature in the range of from 70.0° C. to about 130.0° C., such as from about 115.0° C. to about 130.0° C., e.g., from about 120.0° C. to about 128.0° C. In an embodiment, the decreasing of the membrane's width is conducted while the membrane is exposed to a temperature that is lower than Tm of the first polyethylene. In an embodiment, the third dry width is in the range of from 1.0 times larger than the first dry width to about 1.1 times larger than the first dry width.

It is believed that exposing the membrane to a temperature during the controlled width reduction that is ≥ the temperature to which the membrane was exposed during the TD stretching leads to greater resistance to heat shrinkage in the finished membrane.

[3] Structure, Properties, and Composition

In an embodiment, the membrane's thickness is generally in the range of from about 1 μm to about 100 μm, e.g., from about 5 μm to about 30 μm. The thickness of the microporous membrane can be measured by a contact thickness meter at 1 cm longitudinal intervals over the width of 20 cm, and then averaged to yield the membrane thickness. Thickness meters such as the Litematic available from Mitsutoyo Corporation are suitable. This method is also suitable for measuring thickness variation after heat compression, as described below. Non-contact thickness measurements are also suitable, e.g., optical thickness measurement methods.

The final microporous membrane generally comprises the polymer used to produce the extrudate. A small amount of diluent or other species introduced during processing can also be present, generally in amounts less than 1 wt. % based on the weight of the microporous polyolefin membrane. A small amount of polymer molecular weight degradation might occur during processing, but this is acceptable. In an embodiment, molecular weight degradation during processing, if any, causes the value of MWD of the polymer in the membrane to differ from the MWD of the polymer used to produce the membrane by no more than, e.g., about 10%, or no more than about 1%, or no more than about 0.1%.

While the extrudate and the microporous membrane can contain copolymers, inorganic species (such as species containing silicon and/or aluminum atoms), and/or heat-resistant polymers such as those described in PCT Patent Publication Nos. WO 2007/132942 and WO 2008/016174, these are not required. In an embodiment, the extrudate and membrane are substantially free of such materials. Substantially-free in this context means the amount of such materials in the microporous membrane is less than 1 wt. %, based on the total weight of the polymer used to produce the extrudate.

In one particular embodiment, the membrane comprises 1.0 wt. % to 20.0 wt. % (based on the weight of the membrane) of a polyolefin having an Mw in the range of $1.0 \times 10^4$ to $4.0 \times 10^5$, a $T_{80}-T_{25} \leq 25.0°$ C., a $T_{80} \leq 130.0°$ C., and a $T_{25} \geq 100.0°$ C. The membrane has a shutdown temperature $\leq 130.5°$ C.

In another particular embodiment, the membrane comprises 4.0 wt. % to 17.0 wt. % (based on the weight of the membrane) of a polyolefin having an $Mw \leq 1.0 \times 10^5$, a $T_{80}-T_{25} \leq 15.0°$ C., a $T_{80} \leq 130.0°$ C., and $T_{25} \geq 100°$ C. The membrane has a shutdown temperature $\leq 130.5°$ C.

In yet another particular embodiment, the membrane of any preceding embodiment further comprises a second polyethylene having an $Mw > 1.0 \times 10^6$ and/or a third polyethylene having an $Mw \leq 1.0 \times 10^6$ and a $T_{80} > 132.0°$ C.

In yet another particular embodiment, the membrane comprises about 8.0 wt. % to about 13.0 wt. % of the first polyethylene, based on the weight of the membrane. The first polyethylene is a copolymer of ethylene and 1 mol. % to 5 mol. % of propylene, butene, hexene or octene. The copolymer has a $T_m$ in the range of 122° C. to 126° C. and an Mw in the range of 30,000 to 250,000. The copolymer has a $T_{80} \leq 130.0°$ C., a $T_{25} \leq 100.0°$ C., and $T_{80}-T_{25} \leq 25.0°$ C. The membrane has a shutdown temperature in the range of 125° C. to 130.5° C., and normalized air permeability in the range of $1.0 \times 10^2$ seconds/100 cm$^3$/20 μm to $5.0 \times 10^2$ seconds/100 cm$^3$/20 μm, and a 105° C. heat shrinkage in at least one planar direction $\leq 10\%$.

Optionally, the microporous membrane has one or more of the following properties.

(a) Normalized Air Permeability $\leq 6.0 \times 10^2$ sec/100 cm$^3$/20 μm

In an embodiment, the membrane's normalized air permeability (Gurley value, expressed as the air permeability of an equivalent membrane having a thickness of 20 μm) is $\leq 6.0 \times 10^2$ seconds/100 cm$^3$/20 μm, e.g., in the range of about 50.0 seconds/100 cm$^3$/20 μm to about $5.0 \times 10^2$ seconds/100 cm$^3$/20 μm. Since the air permeability value is normalized to the value for an equivalent membrane having a film thickness of 20 μm, the membrane's air permeability value is expressed in units of "seconds/100 cm$^3$/20 μm". In an embodiment, the normalized air permeability is in the range of $1.0 \times 10^2$ seconds/100 cm$^3$/20 μm to about $4.5 \times 10^2$ seconds/100 cm$^3$/20 μm. Normalized air permeability is measured according to JIS P8117, and the results are normalized to the permeability value of an equivalent membrane having a thickness of 20 μm using the equation $A = 20 μm*(X)/T_1$, where X is the measured air permeability of a membrane having an actual thickness $T_1$ and A is the normalized air permeability of an equivalent membrane having a thickness of 20 μm.

(b) Porosity in the Range of from about 25% to about 80%

In an embodiment, the membrane has a porosity $\geq 25\%$, e.g., in the range of about 25% to about 80%, or 30% to 60%. The membrane's porosity is measured conventionally by comparing the membrane's actual weight to the weight of an equivalent non-porous membrane of the same composition (equivalent in the sense of having the same length, width, and thickness). Porosity is then determined using the formula: Porosity $\% = 100 \times (w2-w1)/w2$, wherein "w1" is the actual weight of the microporous membrane and "w2" is the weight of the equivalent non-porous membrane having the same size and thickness.

(c) Normalized Pin Puncture Strength $\geq 1.5 \times 10^2$ gf/20 μm

In an embodiment, the membrane has a normalized pin puncture strength $\geq 150.0$ gf/20 μm at 50% of porosity, e.g., in the range of 180.0 gf/20 μm at 50% of porosity to $1.0 \times 10^3$ gf/20 μm at 50% of porosity, such as $2.0 \times 10^2$ gf/20 μm at 50% of porosity to $5.0 \times 10^2$ gf/20 μm at 50% of porosity. The membrane's pin puncture strength is expressed as the pin puncture strength of an equivalent membrane having a thickness of 20 μm and a porosity of 50% [gf/20 μm]. Pin puncture strength is defined as the maximum load measured at ambient temperature when a microporous membrane having a thickness of $T_1$ is pricked with a needle of 1 mm in diameter with a spherical end surface (radius R of curvature: 0.5 mm) at a speed of 2 mm/second. The pin puncture strength ("S") is normalized to the pin puncture strength value of an equivalent membrane having a thickness of 20 μm and a porosity of 50% using the equation $S_2 = [50\%*20 μm*(S_1)]/[T_1*(100\%-P)]$, where $S_1$ is the measured pin puncture strength, $S_2$ is the normalized pin puncture strength, P is the membrane's measured porosity, and $T_1$ is the average thickness of the membrane.

(d) Shutdown Temperature $< 130.5°$ C.

The microporous membrane's shutdown temperature is measured by the method disclosed in PCT Patent Publication No. WO2007/052663, which is incorporated by reference herein in its entirety. According to this method, the microporous membrane is exposed to an increasing temperature (5° C./minute beginning at 30° C.) while measuring the membrane's air permeability. The microporous membrane's shutdown temperature is defined as the temperature at which the microporous membrane's air permeability (Gurley Value) first exceeds 100,000 seconds/100 cm$^3$. The microporous membrane's air permeability is measured according to JIS P8117 using an air permeability meter (EGO-1T available from Asahi Seiko Co., Ltd.). In an embodiment, the membrane has a shutdown temperature in the range of 120.0° C. to 130.0° C., e.g., from 124.0° C. to 129.0° C.

(e) Meltdown Temperature $\geq 140°$ C.

Meltdown temperature is measured by the following procedure: A rectangular sample of 3 mm×50 mm is cut out of the microporous membrane such that the long axis of the sample is aligned with the transverse direction of the microporous membrane as it is produced in the process and the short axis is aligned with the machine direction. The sample is set in a thermomechanical analyzer (TMA/SS6000 available from Seiko Instruments, Inc.) at a chuck distance of 10 mm, i.e., the distance from the upper chuck to the lower chuck is 10 mm. The lower chuck is fixed and a load of 19.6 mN applied to the sample at the upper chuck. The chucks and sample are enclosed in a tube which can be heated. Starting at 30° C., the temperature inside the tube is elevated at a rate of 5° C./minute, and sample length change under the 19.6 mN load is measured at intervals of 0.5 second and recorded as temperature is increased. The temperature is increased to 200° C. The meltdown temperature of the sample is defined as the temperature at which the sample breaks, generally at a temperature in the range of about 140° C. to about 200° C., e.g., from about 150° C. to about 155° C.

(f) 105° C. Heat Shrinkage Ratio ≤10% in at Least One Planar Direction

The 105° C. heat shrinkage ratio of the microporous membrane in orthogonal planar directions (e.g., machine direction or transverse direction) is measured as follows: (i) measure the size of a test piece of microporous membrane at ambient temperature in both the machine direction and transverse direction, (ii) equilibrate the test piece at a temperature of 105° C. for 8 hours with no applied load, and then (iii) measure the size of the membrane in both the machine and transverse directions. The thermal shrinkage ratio in either the machine or transverse directions can be obtained by dividing the result of measurement (i) by the result of measurement (ii) and expressing the resulting quotient as a percent.

In an embodiment, the heat shrinkage ratio measured at 105° C. in MD is ≤11%, or alternatively ≤9.0%, or alternatively ≤6%, or alternatively ≤5%, such as in the range of 4.0% to 10.0%. In another embodiment, the heat shrinkage ratio in TD is ≤11%, or alternatively ≤9.0%, or alternatively ≤6%, or alternatively ≤5%, such as in the range of 4.0% to 10.0%.

[4] Battery Separator and Battery

The microporous membrane of this invention has well-balanced shutdown temperature, air permeability, pin puncture strength, and is permeable to liquid (aqueous and non-aqueous) at atmospheric pressure. Thus, the microporous membrane is useful as a battery separator, filtration membrane, and so on. The microporous membrane is particularly useful as a secondary battery separator, such as in a nickel-hydrogen battery, nickel-cadmium battery, nickel-zinc battery, silver-zinc battery, lithium-ion battery, lithium-ion polymer battery separator. In an embodiment, the membrane is used as battery separator film in lithium-ion secondary batteries.

Such batteries are described in PCT Patent Publication No. WO 2008/016174 which is incorporated by reference herein in its entirety.

This invention will be described in more detail with reference to Examples below without intention of restricting the scope of this invention.

EXAMPLES

Example 1

100 parts by mass of a polyethylene mixture comprising 18% by mass of UHMWPE having an Mw of $1.95 \times 10^6$; 74% by mass of the HDPE having Mw of $5.6 \times 10^5$, a $T_m = 134.9°$ C., and a $T_{80} = 135.1°$ C. and 8% by mass of a polyethylene having Mw of $3.8 \times 10^4$, $T_{25} = 114.6°$ C., $T_{80} = 125.9°$ C., and $T_m = 126.1°$ C. are dry-blended with 0.5 parts by mass of tetrakis[methylene-3-(3,5-ditertiary-butyl-4-hydroxyphenyl)-propionate]methane.

25 parts by mass of the resultant mixture is charged into a strong-blending, double-screw extruder (inner diameter=58 mm, L/D=42), and 75 parts by mass of liquid paraffin is supplied to the double-screw extruder via its side feeder.

The polyethylene solution is supplied from the double-screw extruder to a T-die, and extruded in a 1.0-mm-thick sheet shape. The extrudate is cooled by a cooling roll controlled at 50° C. to form a gel-like sheet. The gel-like sheet is simultaneously biaxially stretched by a batch-type stretching machine to 5-fold in both MD and TD while exposing the extrudate to a temperature of 115° C. The stretched sheet is then fixed to an aluminum frame plate of 20 cm×20 cm and immersed in a washing bath of methylene chloride controlled at 25° C., and washed while swaying at 100 rpm for 3 minutes to remove the liquid paraffin. The washed membrane is air-dried at room temperature. The dried membrane is then fixed to a tenter and heat-set at 115° C. for 10 minutes to produce a microporous membrane.

Example 2

A microporous membrane is produced in the same manner as in Example 1 except for using a polyethylene mixture comprising 18% by mass of the UHMWPE and 70% by mass of the HDPE, and 12% by mass of the first polyethylene.

Example 3

A microporous polyethylene membrane is produced in the same manner as in Example 1 except for using a polyethylene mixture comprising 18% by mass of the UHMWPE and 66% by mass of the HDPE, and 16% by mass of the first polyethylene.

Example 4

A microporous polyethylene membrane is produced in the same manner as in Example 2 except for using a first polyethylene having Mw of $1.2 \times 10^5$, $T_{25} = 110.9°$ C., $T_{80} = 123.1°$ C., and $T_m = 123.6°$ C.

Example 5

A microporous polyethylene membrane is produced in the same manner as in Example 1 except for using a first polyethylene having Mw of $8.5 \times 10^4$, $T_{25} = 105.6°$ C., $T_{80} = 122.9°$ C., and $T_m = 123.9°$ C.

Example 6

A microporous polyethylene membrane is produced in the same manner as in Example 2 except for using a first polyethylene having Mw of $2.4 \times 10^5$, $T_{25} = 100.4°$ C., $T_{80} = 122.1°$ C., and $T_m = 122.8°$ C. (Evolve™ SP3530, available from Prime Polymer Co., Ltd.).

Example 7

A microporous polyethylene membrane is produced in the same manner as in Example 2 except for using a first polyethylene having Mw of $2.4 \times 10^5$, $T_{25} = 100.9°$ C., $T_{80} = 121.3°$ C., and $T_m = 122.0°$ C. (Ultzex™ 3021 F, available from Prime Polymer Co., Ltd.).

Example 8

A microporous polyethylene membrane is produced in the same manner as in Example 2 except for using a polyethylene mixture comprising 18% by mass of the UHMWPE and 77% by mass of the HDPE, and 5% by mass of a first polyethylene, the first polyethylene having Mw of $4.5 \times 10^4$, $T_{25} = 105.2°$ C., $T_{80} = 120.5°$ C., and $T_m = 122.2°$ C.

Example 9

A microporous polyethylene membrane is produced in the same manner as in Example 2 except for using a first polyethylene having Mw of $2.6 \times 10^5$, $T_{25} = 102.8°$ C., $T_{80} = 120.8°$ C., and $T_m = 122.5°$ C.

Example 10

A microporous polyethylene membrane is produced in the same manner as in Example 1 except for using a first polyethylene having Mw of $1.7 \times 10^5$, $T_{25}=107.9°$ C., $T_{80}=123.0°$ C., and $T_m=123.0°$ C.

Example 11

100 parts by mass of a polyethylene composition comprising 18% of the UHMWPE having an Mw of $1.95 \times 10^6$, 62% by mass of the HDPE having Mw of $5.6 \times 10^5$, $T_{80}=135.1°$ C. and $T_m=134.9°$ C., and 20% by mass of a polyethylene having Mw of $4.5 \times 10^4$, $T_{25}=105.2°$ C., $T_{80}=120.5°$ C., and $T_m=122.2°$ C. are dry-blended with 0.5 parts by mass of tetrakis[methylene-3-(3,5-ditertiary-butyl-4-hydroxyphenyl)-propionate]methane. Mixing extruding, biaxial stretching, and liquid paraffin removal are conducted as in Example 1. The membrane is then dried by an air flow at room temperature. At the start of dry orientation, the membrane has an initial size in TD (the first dry width) and an initial size in MD (the first dry length). The dried membrane is stretched by a tenter-stretching machine to a TD magnification of 1.2 fold (to a second dry width) while exposing the membrane to a temperature of 118° C. and holding the membrane's length constant at the second dry length. The membrane is then subjected to a controlled reduction in width from the second dry width to a third dry width that is equal to the first dry width, i.e., to a final magnification of 1.0 fold, while exposing the membrane to a temperature of 118° C. In other words, the membrane's width is reduced to the membrane's initial size in TD at the start of dry orientation. After the membrane's width is reduced to the initial width, it is then heat-set by exposing the membrane to a temperature of 118° C. for 12 seconds to produce the finished microporous membrane.

Comparative Example 1

A microporous polyethylene membrane is produced in the same manner as in Example 1 except for using a first polyethylene having Mw of $7.5 \times 10^5$, $T_{25}=100.5°$ C., $T_{80}=116.6°$ C., and $T_m=117.3°$ C.

Comparative Example 2

A microporous polyethylene membrane is produced in the same manner as in Comparative Example 1 except for using a polyethylene mixture comprising 18% by mass of the UHMWPE and 70% by mass of the HDPE, and 12% by mass of the first polyethylene.

Comparative Example 3

A microporous polyethylene membrane is produced in the same manner as in Comparative Example 1 except for using a polyethylene mixture comprising 18% by mass of the UHMWPE and 66% by mass of the HDPE, and 16% by mass of the first polyethylene.

Comparative Example 4

100 parts by mass of a polyethylene mixture comprising 18% by mass of the UHMWPE having an Mw of $1.95 \times 10^6$, 74% by mass of the HDPE having Mw of $5.6 \times 10^5$, $T_{80}=135.1°$ C. and $T_m=134.9°$ C., and 8% by mass of a polyethylene having Mw of $2.1 \times 10^5$, $T_{25}=75.4°$ C., $T_{80}=105.8°$ C., and $T_m=98.0°$ C. are dry-blended with 0.5 parts by mass of tetrakis[methylene-3-(3,5-ditertiary-butyl-4-hydroxyphenyl)-propionate]methane. Mixing and extruding are conducted as in Example 1 to produce a gel-like sheet. The gel-like sheet is simultaneously biaxially stretched by a batch-type stretching machine to 5-fold in both longitudinal direction (MD) and transverse direction (TD) at 110° C. The stretched gel-like sheet is then fixed to an aluminum frame plate of 20 cm×20 cm and immersed in a washing bath of methylene chloride controlled at 25° C., and washed while swaying at 100 rpm for 3 minutes to remove the liquid paraffin. The washed membrane is air-dried at room temperature. It is then heat-set by exposing the membrane to a temperature of 90° C. for 10 minutes to produce the microporous membrane.

Comparative Example 5

A microporous polyethylene membrane is produced in the same manner as in Comparative Example 4 except for using a polyethylene mixture comprising 18% by mass of the UHMWPE and 66% by mass of the HDPE, and 16% by mass of the first polyethylene.

TABLE 1

| No. | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Resin Composition | | | | | | | | | | | |
| PE Composition | | | | | | | | | | | |
| UHMWPE | Mw[(1)] | $1.95 \times 10^6$ | $1.95 \times 10^6$ | $1.95 \times 10^6$ | $1.95 \times 10^6$ | $1.95 \times 10^6$ | $1.95 \times 10^6$ | $1.95 \times 10^6$ | $1.95 \times 10^6$ | $1.95 \times 10^6$ | $1.95 \times 10^6$ |
| | % by mass | 18 | 18 | 18 | 18 | 18 | 18 | 18 | 18 | 18 | 18 |
| HDPE | Mw[(1)] | $5.6 \times 10^5$ | $5.6 \times 10^5$ | $5.6 \times 10^5$ | $5.6 \times 10^5$ | $5.6 \times 10^5$ | $5.6 \times 10^5$ | $5.6 \times 10^5$ | $5.6 \times 10^5$ | $5.6 \times 10^5$ | $5.6 \times 10^5$ |
| | % by mass | 74 | 70 | 66 | 70 | 74 | 74 | 74 | 77 | 70 | 74 |
| PE | Mw[(1)] | $3.8 \times 10^4$ | $3.8 \times 10^4$ | $3.8 \times 10^4$ | $1.2 \times 10^5$ | $8.5 \times 10^4$ | $2.4 \times 10^5$ | $2.4 \times 10^5$ | $4.5 \times 10^4$ | $2.6 \times 10^5$ | $1.7 \times 10^4$ |
| | % by mass | 8 | 12 | 16 | 12 | 8 | 8 | 8 | 5 | 12 | 8 |
| $T_{25}^{(2)}$ (° C.) | | 114.6 | 114.6 | 114.6 | 110.9 | 105.6 | 100.4 | 100.9 | 105.2 | 102.8 | 107.9 |
| $T_{80}^{(3)}$ (° C.) | | 125.9 | 125.9 | 125.9 | 123.1 | 122.9 | 122.1 | 121.3 | 120.5 | 120.8 | 123.0 |
| $T_{80} - T_{25}$ | | 11.3 | 11.3 | 11.3 | 12.3 | 17.3 | 21.7 | 20.4 | 15.3 | 18.0 | 15.1 |
| $T_m$ (° C.) | | 126.1 | 126.1 | 126.1 | 123.6 | 123.9 | 122.8 | 122.0 | 122.2 | 122.2 | 123.0 |
| Production Conditions | | | | | | | | | | | |
| PE Concentration (% by mass) in PE-diluent | | 25 | 25 | 25 | 25 | 25 | 25 | 25 | 25 | 25 | 25 |

TABLE 1-continued

| | | | | | | | | | | |
|---|---|---|---|---|---|---|---|---|---|---|
| Mixture Stretching | | | | | | | | | | |
| Temperature (° C.) | 115 | 115 | 115 | 115 | 115 | 115 | 115 | 115 | 115 | 115 |
| Magnification (MD × TD)[4] | 5 × 5 | 5 × 5 | 5 × 5 | 5 × 5 | 5 × 5 | 5 × 5 | 5 × 5 | 5 × 5 | 5 × 5 | 5 × 5 |
| Heat Setting | | | | | | | | | | |
| Temperature (° C.) | 115 | 115 | 115 | 115 | 115 | 115 | 115 | 115 | 115 | 115 |
| Time (minute) | 10 | 10 | 10 | 10 | 10 | 10 | 10 | 10 | 10 | 10 |
| Average Thickness (μm) | 16.0 | 19.1 | 22.9 | 21.2 | 22.2 | 22.0 | 19.8 | 20.1 | 18.6 | 22.3 |
| Normalized Air Permeability (sec/100 cm³/20 μm) | 218 | 220 | 250 | 383 | 323 | 385 | 372 | 276 | 401 | 329 |
| Heat Shrinkage MD/TD (%) | 7.5/7.5 | 7.2/7.6 | 8.0/7.7 | 5.3/4.1 | 7.4/5.7 | 7..2/6.2 | 7.1/7.7 | 10.5/10.0 | 8.8/7.4 | 6.4/5.8 |
| Porosity (%) | 44.0 | 48.5 | 49.8 | 44.0 | 42.4 | 45.0 | 45.0 | 41.8 | 46.1 | 46.6 |
| Normalized Pin Puncture Strength (g/20 μm; 50% porosity) | 345 | 181 | 176 | 173 | 196 | 190 | 242 | 331 | 199 | 184 |
| Shutdown Temperature (° C.) | 129.8 | 128.7 | 127.0 | 127.7 | 128.3 | 128.5 | 126.6 | 129.9 | 128.9 | 129.1 |

| No. | | Ex. 11 | Comparative Example 1 | Comparative Example 2 | Comparative Example 3 | Comparative Example 4 | Comparative Example 5 |
|---|---|---|---|---|---|---|---|
| Resin Composition | | | | | | | |
| PE Composition | | | | | | | |
| UHMWPE | Mw[1] | 1.95 × 10⁶ | 1.95 × 10⁶ | 1.95 × 10⁶ | 1.95 × 10⁶ | 1.95 × 10⁶ | 1.95 × 10⁶ |
| | % by mass | 18 | 18 | 18 | 18 | 18 | 18 |
| HDPE | Mw[1] | 5.6 × 10⁵ | 5.6 × 10⁵ | 5.6 × 10⁵ | 5.6 × 10⁵ | 5.6 × 10⁵ | 5.6 × 10⁵ |
| | % by mass | 62 | 74 | 70 | 66 | 74 | 66 |
| PE | Mw[1] | 4.5 × 10⁴ | 7.5 × 10⁵ | 7.5 × 10⁵ | 7.5 × 10⁵ | 2.1 × 10⁴ | 2.1 × 10⁴ |
| | % by mass | 20 | 8 | 12 | 16 | 8 | 16 |
| $T_{25}$[2] (° C.) | | 105.2 | 100.5 | 100.5 | 100.5 | 75.4 | 75.4 |
| $T_{80}$[3] (° C.) | | 120.5 | 116.6 | 116.6 | 116.6 | 105.8 | 105.8 |
| $T_{80} - T_{25}$ | | 15.3 | 16.1 | 16.1 | 16.1 | 30.4 | 30.4 |
| $T_m$ (° C.) | | 122.2 | 117.3 | 117.3 | 117.3 | 98 | 98 |
| Production Conditions | | | | | | | |
| PE Concentration (% by mass) in PE-Diluent Mixture | | 25 | 25 | 25 | 25 | 25 | 25 |
| Stretching | | | | | | | |
| Temperature (° C.) | | 115 | 115 | 115 | 115 | 110 | 110 |
| Magnification (MD × TD)[4] | | 5 × 5 | 5 × 5 | 5 × 5 | 5 × 5 | 5 × 5 | 5 × 5 |
| Heat Setting | | | | | | | |
| Temperature (° C.) | | 118 | 115 | 115 | 115 | 90 | 90 |
| Time (minute) | | 0.2 | 10 | 10 | 10 | 10 | 10 |
| Average Thickness (μm) | | 20.6 | 21.5 | 18.3 | 10 | 23.4 | 22 |
| Normalized Air Permeability (sec/100 cm³/20 μm) | | 590 | 481 | 512 | 795 | 432 | 880 |
| Heat Shrinkage MD/TD (%) | | 6.7/0.7 | 7.6/7.9 | 6.7/7.0 | 5.8/5.7 | 16.5/17.1 | 14.7/15.2 |
| Porosity (%) | | 33.2 | 43.8 | 47.1 | 37.0 | 49.0 | 46.0 |
| Normalized Pin Puncture Strength (g/20 μm; 50% porosity) | | 249 | 220 | 225 | 253 | 170 | 173 |
| Shutdown Temperature (° C.) | | 126.7 | 131.6 | 131.0 | 129.2 | 128.9 | 122.6 |

Note:
[1]Mw represents a weight-average molecular weight.
[2]A temperature at which the crystal-melting calorie $\Delta H_m$ measured by DSC at a temperature-elevating speed of 10° C./minute reached 25% of the total $\Delta H_m$.
[3]A temperature at which the crystal-melting calorie $\Delta H_m$ measured by DSC at a temperature-elevating speed of 10° C./minute reached 80% of the total $\Delta H_m$.

As is clear from Table 1, the microporous polyethylene membranes of Examples 1 to 10 have a shutdown temperature less than 130° C. and a normalized air permeability ≤6.0×10² seconds/100 cm³/20 μm. The membranes of Examples 1 to 10 also have a good balance among shutdown temperature, permeability, pin puncture strength, and 105° C. heat shrinkage. Particularly, the microporous membranes in Examples of 1, 5, 6, 7, 8, and 10 show excellent balance of properties in spite of containing a relatively small amount of the first polyethylene. On the other hand, the membranes produced from polyethylene having $T_m$ of 117.3° C. in Comparative Example 1 and 2 have a significantly higher shutdown temperature. The membrane in Comparative Example 3 has poor air permeability. The membrane having $T_{25}$=98° C. (<than 100° C.) and a $T_{80}-T_{25}$=30.4° C. (>25° C.) in Comparative Examples 4 and 5 have relatively low shutdown temperature; but the low stretching and heat setting temperatures needed for acceptable air permeability result in a significant degradation in 105° C. heat shrinkage performance.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical limits are numerical upper limits are listed herein, ranges from any lower limit to any upper limit are contemplated.

What is claimed is:

1. A microporous membrane comprising a first polyethylene in an amount of 1.0 wt. % to 20.0 wt. %, having a $T_{80}$≤130.0° C., a $T_{25}$≥100.0° C., a $T_{80}-T_{25}$≤25.0° C., and an Mw of 1.0×10⁴ to 4.0×10⁵, the wt. % being based on the weight of the membrane, a second polyethylene having an Mw>1.0×10⁶, and a third polyethylene having an Mw≤1.0×10⁶ and a $T_{80}$>132.0° C., wherein the microporous membrane is a monolayer membrane that is an extrudate comprising the first polyethylene and has a shutdown temperature in the range of 120° C. to 130° C.

2. The microporous membrane of claim 1, wherein the first polyethylene has a $T_m$ in the range of from 120.0° C. to 126.0° C.

3. The microporous membrane of claim 1, wherein the microporous membrane has a normalized air permeability ≤6.0×10² seconds/100 cm³/20 μm, a normalized pin puncture strength ≥1.5×10³ gf/20 μm, and a 105° C. heat shrinkage in TD in the range of ≤10.0%.

4. The microporous membrane of claim 1, wherein the microporous membrane has a shutdown temperature in the range of 124.0° C. to 129.0° C.

5. The microporous membrane of claim 1, wherein the first polyethylene has an Mw≥1.0×10⁵, a $T_{80}-T_{25}$≤15° C., and wherein the first polyethylene is present in the membrane in an amount in the range of from 10 wt. % to 30 wt. %, based on the weight of the membrane.

6. A battery separator comprising the microporous membrane of claim 1.

* * * * *